United States Patent [19]

Pineau

[11] Patent Number: 4,516,285
[45] Date of Patent: May 14, 1985

[54] PICK-UP SWEEPER OF THE TYPE WITH ELEVATING CONVEYOR WITH DIRT DISTRIBUTING DEVICE IN THE DIRT COLLECTING RECEPTACLE

[75] Inventor: Jean Pineau, Suresnes, France

[73] Assignee: Le Materiel de Voirie, Sarl, Argenteuil, France

[21] Appl. No.: 522,008

[22] Filed: Aug. 11, 1983

[30] Foreign Application Priority Data

Aug. 20, 1982 [FR] France ................................ 82 14762

[51] Int. Cl.³ .............................................. E01H 1/04
[52] U.S. Cl. ........................................ 15/84; 414/301; 414/502
[58] Field of Search ........................................ 15/83–87, 15/340; 414/301, 502

[56] References Cited

U.S. PATENT DOCUMENTS

| 2,109,123 | 2/1938 | White et al. | 414/301 |
| 2,743,829 | 5/1956 | Ballard | 15/84 X |
| 2,789,804 | 4/1957 | Toulmin, Jr. | 15/340 X |
| 3,361,258 | 1/1968 | Kaike | 414/301 X |
| 3,469,718 | 9/1969 | Felix et al. | 414/301 |

Primary Examiner—Edward L. Roberts
Attorney, Agent, or Firm—Amster, Rothstein & Engelberg

[57] ABSTRACT

In this pick-up sweeper, the dirt distributing device (8) is formed by a rotary disk (21) whose axis is substantially vertical and by means (22) for rotating the disk. To improve the filling of the truck (7) the disk (21) may be driven selectively in one or other direction of rotation. Furthermore, the disk (21) is mounted on a support (22) which is itself pivotably mounted about a horizontal axis (23; 27) perpendicular to the longitudinal axis of the pick-up sweeper, and actuating means (26) are connected to said support for causing this latter and the disk (21) to pivot about said horizontal axis.

12 Claims, 5 Drawing Figures

PICK-UP SWEEPER OF THE TYPE WITH ELEVATING CONVEYOR WITH DIRT DISTRIBUTING DEVICE IN THE DIRT COLLECTING RECEPTACLE

The present invention relates to a pick-up sweeper of the type in which the dirt or refuse swept on the ground by at least one rotary brush is raised by means of an elevating conveyor which discharges it by gravity into a receptacle, and in whch a dirt distributing device is rotatably mounted below the output end of the elevating conveyor.

In pick-up sweepers of the type with elevating conveyor, the dirt tipped by the elevating conveyor falls by gravity into the receptacle while forming a tipping cone. This is why, so as to obtain better distribution of the dirt in the receptacle and better filling thereof, it has already been proposed to dispose a dirt distributing device under the output end of the elevating conveyor (see for example patents FR No. 414 038, GB No. 858 080 and U.S. Pat. No. 2,109,123; see also patents FR No. 2 291 929 and DE No. 858 080 and 1 101 280 although they do not relate to pick-up sweepers).

In some cases, it has been noted that, despite the presence of the distributing device, correct filling of the receptacle is not obtained. That occurs particularly during the cleaning of gutters at the side of a road and when the roadway slopes towards one side. In both cases, it has in fact been noted that distribution of the load (dirt) on the elevating conveyor is offset towards one side, so that the dirt tends to fall into the receptacle from one side thereof despite the presence of the distributing device.

According to the present invention, this problem is resolved by the fact that the dirt distributing device is formed by a rotary disk, whose axis is substantially vertical, and by the fact that the means for rotating the disk comprise means for reversing the direction of rotation of the disk.

Preferably, the disk is mounted on a support which is itself pivotably mounted above a horizontal axis perpendicular to the longitudinal axis of the pick-up sweeper and actuating means are connected to said support for causing it and the disk to pivot about said horizontal axis, so as to vary the inclination of the axis of rotation of the disk.

The present invention will now be described with reference to the accompanying drawings in which.

Figure 1:
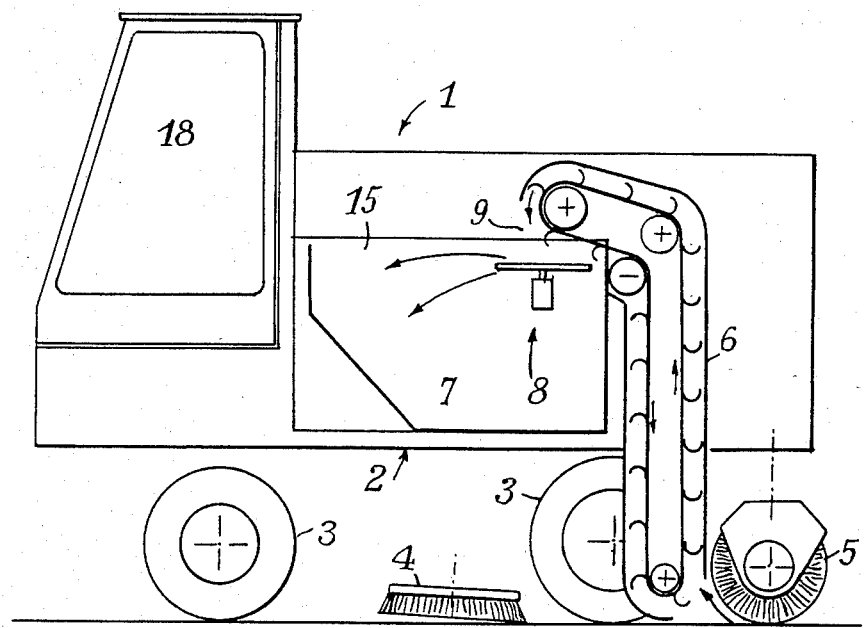
FIG. 1 shows schematically, in elevation, a pickup sweeper in accordance with the present invention.

The road-sweeper shown in FIG. 1 is of the self-propelled type. However, it should be noted that the present invention is also applicable to sweeping and collecting apparatus towed by an appropriate tractor. The pick-up sweeper 1 comprises a chassis 2 having wheels 3 for travelling over the ground under the action of an engine, not shown.

Rotary brushes 4 and 5 are mounted under the chassis 2 in a conventional arrangement. Brushes 4 and 5 serve in combination with elevating conveyor 6 mounted in chassis 2, as means for picking up dirt from the ground and loading it into receptacle 7 housed in chassis 2.

As shown in FIG. 1, a distributing device 8 is provided at the upper part of receptacle 7 just below the outlet end 9 of the elevating conveyor 6.

Figure 2:
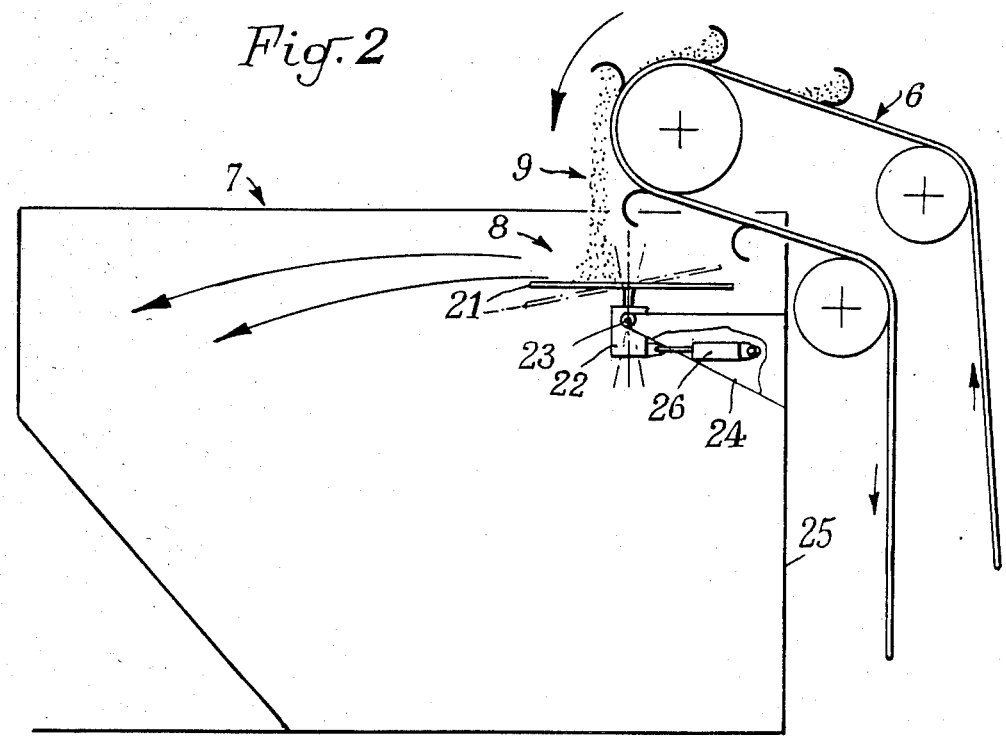
FIGS. 2 and 3 show schematically, respectively in longitudinal section and in a top view, an arrangement of the dirt distributing disk of the pick-up sweeper of FIG. 1.

The dirt distributing device 8 is formed by a rotary disk 21, whose axis is substantially vertical. As shown in FIG. 2, the axis of disk 21 is slightly offset rearwardly of the collecting receptacle 7 with respect to the path followed by the dirt tipped by the elevating conveyor 6 so that said dirt falls on to disk 21 in a zone thereof situated between its center and its peripheral edge.

Disk 21 may be rotated by an appropriate transmission from drive means already provided in the pick-up sweeper for driving the elevating conveyor 6 or, as is shown in the drawings, disk 21 may be rotated directly by a motor 22, for example a hydraulic motor to the output shaft of which it is fixed. Preferably, motor 22 is disposed below disk 21 so as to be protected thereby from the dirt discharged by the elevating conveyor 6.

Figure 3:
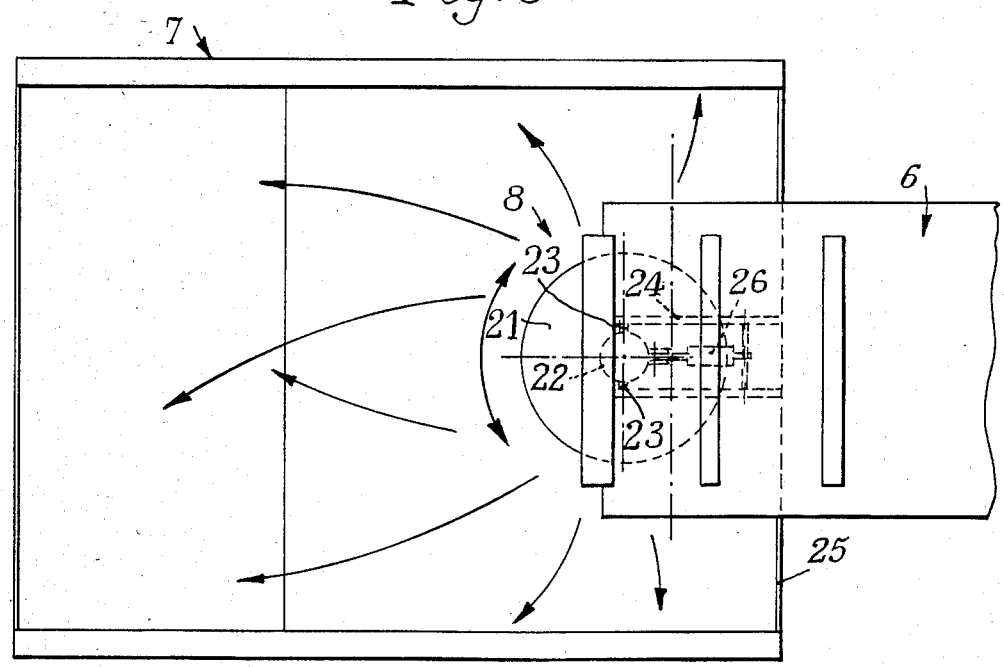

With such a dirt distributing device, the dirt falling on to disk 21 is projected radially by the centrifugal force as shown by the arrows in FIGS. 2 and 3 and is spread out in the collecting receptacle 7. The rotational speed of disk 21 is determined so as to obtain projection of the dirt over the whole length of receptacle 7. Preferably, the rotation speed of disk 21 may be adjusted depending on the density of the dirt collected. To this end, in the case where disk 21 is rotated by its own drive motor 22, this latter may be a variable speed motor. With the same end in view, a mechanical speed variator may also be provided between disk 21 and its drive motor or in the transmission between disk 21 and the means for driving the elevating conveyor 6, according as to whether disk 21 is driven by its own motor or from the elevating conveyor drive means. The adjustment of the rotational speed of disk 21 may be effected either manually by the driver of the sweeper or automatically. In the case where it is effected automatically, the speed variation may be controlled by a control signal which acts on the drive motor or on the above-mentioned speed variator and which depends on the weight of the dirt raised by the conveyor 6. For example, if the drive motor of conveyor 6 is a hydraulic motor, the variation in the weight of the dirt may be detected as a variation of the hydraulic pressure of the drive motor of the conveyor 6 and, in this case, the above-mentioned control signal may be the hydraulic pressure itself or the output signal of a pressure sensor adapted for measuring said hydraulic pressure.

Furthermore, since the direction in which the dirt is projected by disk 21 into receptacle 7 may vary depending on different factors, for example the nature and the density of the dirt, the slope of the ground, the distribution of the dirt in the transverse direction on the elevating conveyor 6 and also the rotational direction of disk 21, this latter may be rotated in both directions. This possibility is particularly advantageous when cleaning gutters, which gives a laterally offset distribution of the dirt on the conveyor 6. To this end motor 22 may be a motor with two directions of rotation or, if need be, a mechanical reversing means may be provided in the transmission means between the disk 21 and its drive motor or the means for driving the elevating conveyor 6, depending on whether disk 21 is driven by its own motor or from the means for driving the elevating conveyor 6.

Furthermore, still with the object of obtaining proper distribution of dirt in receptacle 7, disk 21 is preferably pivotably mounted about a horizontal axis perpendicular to the longitudinal axis of the pick-up sweeper. To this end, as shown in FIGS. 2 and 3, motor 22 or an appropriate support member of motor 22 is provided with two trunnions 23 which are rotatably mounted in a bracket 24 fixed to the rear wall 25 of receptacle 7. A hydraulic or electric actuator 26, mounted between bracket 24 and motor 22 or its support and able to be remote controlled from the driving post 18 of the pick-up sweeper, allows the motor 22 to be pivoted about the axis of the two trunnions 23. Actuator 26 has an active stroke whose amplitude is such that the axis of rotation of disk 21 may be brought, by pivoting about the axis of trunnions 23, at least into two work positions forming an angle of about 10° on each side of a vertical position, preferably in any position between the above-mentioned two positions.

Figure 4:
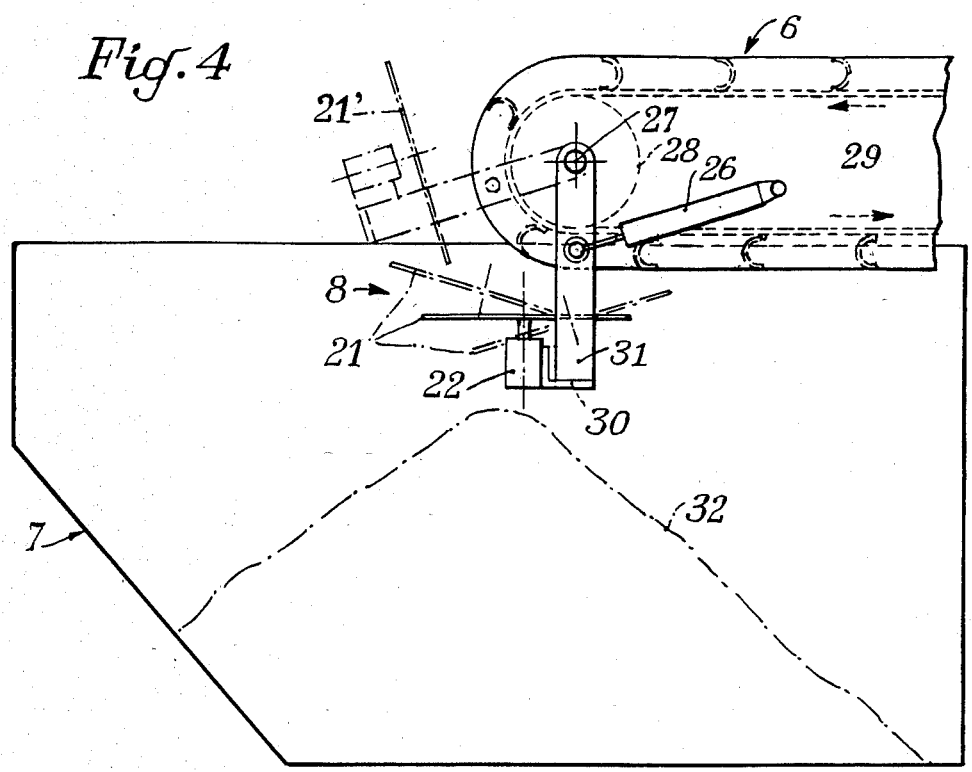
FIGS. 4 and 5 are views similar to FIGS. 2 and 3, respectively, showing a modified arrangement of the dirt distributing disk.
Figure 5:
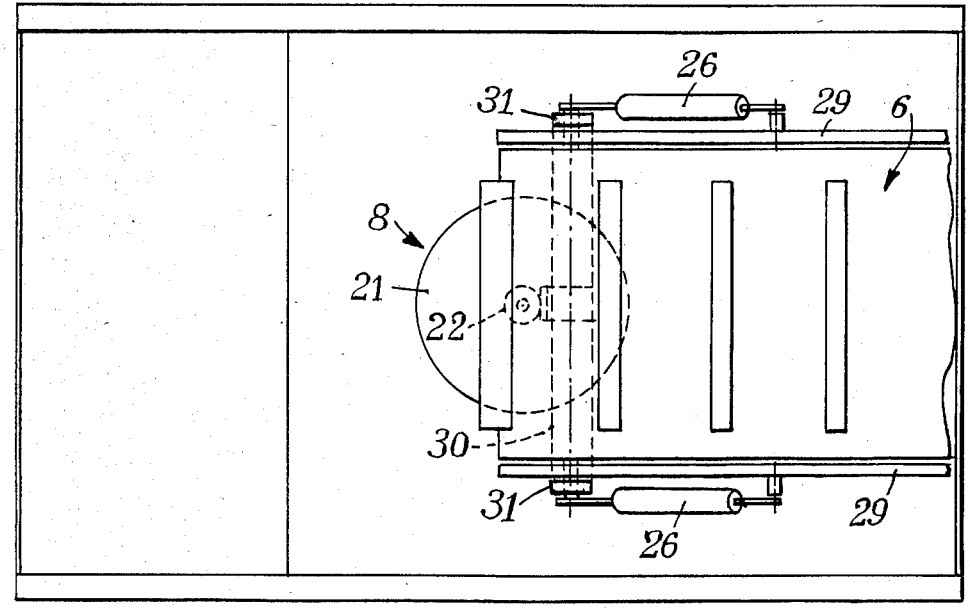

In the modified embodiment shown in FIGS. 4 and 5, disk 21 and its drive motor 22 are pivotably mounted about a horizontal axis which is situated above disk 21. Said horizontal axis may be advantageously the shaft 27 of the upper endmost drum 28 of the conveyor 6, as can be better seen in FIG. 4. In this case, the two ends of shaft 27 extend respectively beyond the lateral plates 29 of the chassis of the conveyor 6, and the motor 22 is fixed to a horizontal cross-piece 30, whose ends are fixed respectively to the lower ends of two parallel and spaced apart arms 31 which are pivotably mounted by their upper ends to the ends of shaft 27. One or two hydraulic or electric actuators 26 are mounted between one or both arms 31 and one or both plates 29.

In FIGS. 4 and 5, the upper part of the elevating conveyor 6 extends substantially horizontally above receptacle 7 and its discharge end is substantially in the middle of the length of receptacle 7. Such an arrangement, in combination with the arrangement shown for suspending motor 22 and disk 21, is particularly advantageous to the extent that it allows a receptacle 7 to be used of greater length than that in FIGS. 2 and 3. Furthermore, such an arrangement also allows better filling of receptacle 7 in the zone thereof which is below disk 21. In fact, in this case, the actuator(s) preferably have an active stroke whose amplitude is such that disk 21 may be brought by pivoting about the axis of shaft 27 into an inactive position (shown with a dash-dot line at 21') so that the dirt discharged by the elevating conveyor 6 falls by gravity directly into receptacle 7, without impinging on disk 21, and collects in a heap 32 on the bottom of said receptacle. Then, when the heap of dirt 32 has reached a certain height, as shown with a dash-dot line in FIG. 3, disk 21 is brought by means of the actuator(s) successively into the positions shown with a broken line and a continuous line in FIG. 3 so as to fill the rear and front parts of receptacle 7.

It goes without saying that the embodiments of the present invention which have been described above have been given solely by way of examples which are purely indicative and in no wise limiting and that numerous modifications may be readily made by a man skilled in the art without for all that departing from the scope and spirit of the present invention.

I claim:

1. In a pick-up sweeper comprising at least one rotary brush for sweeping and collecting dirt on the ground, a dirt receptacle, an elevating conveyor having a lower input end associated with said rotary brush for receiving dirt collected thereby and an upper output end associated with said receptacle for discharging said dirt by gravity into said receptacle, and distributing means adjacent the upper output end of said elevating conveyor for evenly distributing said dirt into said receptacle, the improvement comprising said distributing means comprising a rotary disk located below the upper output end of said conveyor and having a substantially vertical axis of rotation, and driving means connected to said rotary disk for rotating same, said driving means including means for reversing the direction of rotation of the disk.

2. The pick-up sweeper according to claim 1, wherein said disk is mounted on a support which is itself pivotably mounted about a horizontal axis perpendicular to the longitudinal axis of the pick-up sweeper, and further comprising actuating means which are connected to said support for causing said support and the disk to pivot about said horizontal axis.

3. The pick-up sweeper according to claim 2, wherein said horizontal axis is situated below the disk.

4. The pick-up sweeper according to claim 2, wherein said horizontal axis is situated above the disk.

5. The pick-up sweeper according to claim 4, wherein said horizontal axis is a shaft of an upper endmost drum of the elevating conveyor.

6. The pick-up sweeper according to claim 2, wherein said actuating means has an active stroke whose amplitude is such that the rotational axis of the disk may be brought, by pivoting about said horizontal axis, at least into two work positions forming an angle of about 10° on each side of a vertical position.

7. The pick-up sweeper according to claim 6, wherein said actuating means has an active stroke whose amplitude is such that the disk may be further brought, by pivoting about said horizontal axis into an inactive position in which said disk is outside the path of the dirt which is tipped by the elevating conveyor and which falls by gravity into the receptacle.

8. The pick-up sweeper according to claim 2, wherein said means for rotating the disk comprises a motor, which is disposed below the disk and serves as a support therefor, said disk being fixed to the output shaft of the motor.

9. The pick-up sweeper according to claim 8, wherein said motor is pivotably mounted about said horizontal axis in a support which is fixed to a rear panel of the receptacle.

10. The pick-up sweeper according to claim 8, wherein said motor is fixed to a horizontal cross-piece whose ends are fixed respectively to lower ends of two parallel and spaced apart arms which are pivotably mounted by their upper ends to said horizontal axis.

11. The pick-up sweeper according to claim 8, wherein said motor is a motor with two directions of rotation.

12. In a pick-up sweeper comprising at least one rotary brush for sweeping and collecting dirt on the ground, a dirt receptacle, an elevating conveyor having a lower input end associated with said rotary brush for receiving dirt collected thereby and an upper output end associated with said receptacle for discharging said dirt by gravity into said receptacle, and distributing means adjacent the upper output end of said elevating conveyor for evenly distributing said dirt into said receptacle, the improvement comprising said distributing means comprising a rotary disk located below the upper output end of said conveyor and having a substantially vertical axis of rotation, and driving means connected to said rotary disk for rotating same, said driving means including means for reversing the direction of rotation of the disk, and said disk is mounted on a support which is pivotably mounted about a horizontal axis perpendicular to the longitudinal direction of the pick-up sweeper, and actuating means connected to said support for causing said support and said disk to pivot about said horizontal axis.

* * * * *